US012624432B2

(12) United States Patent
Sanchez Poncela et al.

(10) Patent No.: US 12,624,432 B2
(45) Date of Patent: May 12, 2026

(54) METAL POWDER FOR ADDITIVE MANUFACTURING

(71) Applicant: ArcelorMittal, Luxembourg (LU)

(72) Inventors: Manuel Sanchez Poncela, Aviles (ES); Nele Van Steenberge, Ghent (BE); Florencia Gatti, Aviles (ES); Sandra Rodriguez, Aviles (ES)

(73) Assignee: ArcelorMittal, Luxembourg (LU)

( * ) Notice: Subject to any disclaimer, the term of this patent is extended or adjusted under 35 U.S.C. 154(b) by 715 days.

(21) Appl. No.: 17/785,115

(22) PCT Filed: Dec. 18, 2020

(86) PCT No.: PCT/IB2020/062159
§ 371 (c)(1),
(2) Date: Jun. 14, 2022

(87) PCT Pub. No.: WO2021/124229
PCT Pub. Date: Jun. 24, 2021

(65) Prior Publication Data
US 2023/0011220 A1     Jan. 12, 2023

(30) Foreign Application Priority Data
Dec. 19, 2019     (WO) .................. PCT/IB2019/061070

(51) Int. Cl.

| | |
|---|---|
| *B22F 1/065* | (2022.01) |
| *B22F 1/052* | (2022.01) |
| *B33Y 70/00* | (2020.01) |
| *C22C 38/02* | (2006.01) |
| *C22C 38/40* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/56* | (2006.01) |

(52) U.S. Cl.
CPC .............. *C22C 38/40* (2013.01); *B22F 1/052* (2022.01); *B22F 1/065* (2022.01); *B33Y 70/00* (2014.12); *C22C 38/02* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/56* (2013.01)

(58) Field of Classification Search
None
See application file for complete search history.

(56) References Cited

U.S. PATENT DOCUMENTS

| | | | |
|---|---|---|---|
| 2009/0267855 A1 | 10/2009 | Maruko et al. | |
| 2011/0048587 A1 | 3/2011 | Vecchio et al. | |
| 2013/0174942 A1 | 7/2013 | Bonnet | |
| 2016/0180994 A1 | 6/2016 | Kuo et al. | |
| 2016/0298216 A1 | 10/2016 | Kino et al. | |
| 2016/0348222 A1 | 12/2016 | Valls | |
| 2018/0044766 A1 | 2/2018 | Tidesten | |
| 2018/0090252 A1* | 3/2018 | Kudo ...................... C22C 38/32 |
| 2018/0105906 A1 | 4/2018 | Boisvert et al. | |
| 2018/0339341 A1 | 11/2018 | Tatsumi et al. | |
| 2018/0345366 A1 | 12/2018 | Hofmann | |
| 2019/0292622 A1 | 9/2019 | Garat et al. | |
| 2019/0355498 A1 | 11/2019 | Yoshidome et al. | |
| 2020/0258665 A1* | 8/2020 | Kudo .................. H01F 1/14791 |

FOREIGN PATENT DOCUMENTS

| | | |
|---|---|---|
| CN | 104087833 A | 10/2014 |
| CN | 104136147 A | 11/2014 |
| CN | 107240471 A | 10/2017 |
| CN | 109154055 A | 1/2019 |
| EP | 3533539 A1 | 9/2019 |
| JP | 2001234918 A | 8/2001 |
| JP | 2010242216 A | 10/2010 |
| JP | 2012214826 A | 11/2012 |
| JP | 2016025352 A | 2/2016 |
| WO | WO2008018179 A | 2/2008 |

(Continued)

OTHER PUBLICATIONS

U.S. Appl. No. 17/785,733, filed Jun. 15, 2022 which is a national phase of PCT/IB2019061158 which was published as WO 2021123894A1 on Jun. 24, 2021.
U.S. Appl. No. 17/785,675, filed Jun. 14, 2022 which is a national phase of PCT/IB2020061889 which was published as WO 2021124069 A1 on Jun. 24, 2021.
U.S. Appl. No. 17/783,114, filed Jun. 15, 2022 which is a national phase of PCT/IB2019061160 which was published as WO 2021/123895 A1 on Jun. 24, 2021.
ISR of PCT/IB2019/061160 dated Mar. 7, 2020.
Written opinion of ISA of PCT/IB2020/061160.
ISR of PCT/IB2019/062159 dated Dec. 3, 2021.
Written opinion of ISA of PCT/IB2020/062159.

(Continued)

*Primary Examiner* — Xiaowei Su
(74) *Attorney, Agent, or Firm* — Davidson Kappel LLC

(57) ABSTRACT

A metal powder having a composition including the following elements, expressed in content by weight: $6.5\% \leq Si \leq 10\%$, $4.5\% \leq Nb \leq 10\%$, $0.2\% \leq B \leq 2.0\%$, $0.2\% \leq Cu \leq 2.0\%$, $C \leq 2\%$ and optionally containing $Ni \leq 10$ wt % and/or $Co \leq 10$ wt % and/or $Cr \leq 7$ wt % and/or Zr as a substitute for any part of Nb on a one-to-one basis and/or Mo as a substitute for any part of Nb on a one-to-one basis and/or P as a substitute for any part of Si on a one-to-one basis, the balance being Fe and unavoidable impurities resulting from the elaboration, the metal powder having a microstructure including at least 5% in area fraction of an amorphous phase, the balance being made of crystalline ferritic phases with a grain size below 20 μm and possible precipitates, the metal powder having a mean sphericity SPHT of at least 0.80.

20 Claims, No Drawings

(56) References Cited

FOREIGN PATENT DOCUMENTS

| WO | WO 2018024892 A1 | 2/2018 |
| WO | WO2019189614 A1 | 10/2019 |
| WO | WO 2021/123895 A1 | 6/2021 |
| WO | WO 2021123894 A1 | 6/2021 |
| WO | WO 2021124069 A1 | 6/2021 |
| WO | WO 2021124229 A1 | 6/2021 |

OTHER PUBLICATIONS

Garibaldi Michele et al, "Metallurgy of high-silicon steel parts produced using Selective Laser Melting", Acta Materialia, Elsevier, Oxford, GB, (Mar. 22, 2016), vol. 110, doi:10.1016/J.ACTAMAT. 2016.03.037, ISSN 1359-6454, pp. 207-216.

Tiismus Hans et al, "Axial Synchronous Magnetic Coupling Modeling and Printing with Selective Laser Melting", 2019 IEEE 60th International Scientific Conference on Power and Electrical Engineering of Riga Technical University (RTUCON), IEEE, (Oct. 7, 2019).

ISR of PCT/IB2019/061889 dated May 3, 2021.

Written opinion of ISA of PCT/IB2020/061889.

Chengsong Cui et al, "Austenitic Stainless Steel Powders with Increased Nitrogen Content for Laser Additive Manufacturing", Metals, (Dec. 30, 2019), vol. 10, No. 1.

ISR of PCT/IB2019/061158 dated Jul. 22, 2020.

Written opinion of ISA of PCT/IB2020/061158.

\* cited by examiner

METAL POWDER FOR ADDITIVE MANUFACTURING

The present invention relates to a metal powder for the manufacturing of steel parts and in particular for their additive manufacturing. The present invention also relates to the method for manufacturing the metal powder.

BACKGROUND

Fe-based bulk metallic glasses (BMGs) have been attracting much attention due to their excellent soft-magnetic property, high corrosion resistance, good mechanical properties, etc. They have been utilized as high-efficient magnetic middle and high-frequency transformers in the electric and electronic industries. However, until now, most Fe-based BMGs with good soft magnetic properties can only be produced in very complex process conditions. The liquid compositions have to be casted with a high cooling rate between chilled rolls to obtain an amorphous material generally in the form of a thin ribbon. They are subsequently annealed in very unique process conditions to produce materials of nanocrystalline type. Furthermore, they can only be produced in thin ribbons which drastically limit their use.

SUMMARY OF THE INVENTION

It is an object of the present invention to remedy the drawbacks of the prior art by providing Fe-based BMGs which can be easily produced and easily processed to obtain final parts.

The present invention provides a metal powder having a composition comprising the following elements, expressed in content by weight:
  6.5%≤Si≤10%
  4.5%≤Nb≤10%
  0.2%≤B≤2.0%
  0.2%≤Cu≤2.0%
  C≤2%
  and optionally containing:
  Ni≤10 wt % and/or,
  Co≤10 wt % and/or,
  Cr≤7 wt % and/or,
  Zr as a substitute for any part of Nb on a one-to-one basis and/or,
  Mo as a substitute for any part of Nb on a one-to-one basis and/or,
  P as a substitute for any part of Si on a one-to-one basis and/or,
  one or more additional elements selected from among: Hf, Ta, W, V or Y and wherein a content by weight of each additional element is less than 3.5% and/or,
  one or more rare earth metals, wherein a content by weight of each rare earth metal is less than 0.2%,
  the balance being Fe and unavoidable impurities resulting from the elaboration, the metal powder having a microstructure comprising at least 5% in area fraction of an amorphous phase, the balance being made of crystalline ferritic phases with a grain size below 20 μm and possible precipitates, the metal powder having a mean sphericity SPHT of at least 0.85.

The metal powder according to the invention may also have the optional features listed below, considered individually or in combination:

the grain size of the ferritic phases is below 10 μm,
  not more than 7% of the particles composing the metal powder have a sphericity SPHT inferior to 0.70.
  the mean aspect ratio of the particles composing the metal powder is above 0.71,
  at least 80% of the particles composing the metal powder have a size in the range of 15 μm to 170 μm.
  the microstructure comprises at most 45% in area fraction of the amorphous phase,
  the crystalline ferritic phases of the microstructure are Fe-α(Si) and Fe3Si (DO3).

A second subject of the invention consists of a process for manufacturing a metal powder for additive manufacturing, comprising:
  (i) Melting elements and/or metal-alloys at a temperature at least 150° C. above the liquidus temperature so as to obtain a molten composition comprising, expressed in content by weight, 6.5%≤Si≤10%, 4.5%≤Nb≤10%, 0.2%≤B≤2.0%, 0.2%≤Cu≤2.0%, C≤2% and optionally containing Ni≤10 wt % and/or Co≤10 wt % and/or Cr≤7 wt % and/or Zr as a substitute for any part of Nb on a one-to-one basis and/or Mo as a substitute for any part of Nb on a one-to-one basis and/or P as a substitute for any part of Si on a one-to-one basis and/or one or more additional elements selected from among: Hf, Ta, W, V or Y and wherein a content by weight of each additional element is less than 3.5% and/or one or more rare earth metals, wherein a content by weight of each rare earth metal is less than 0.2%, the balance being Fe and unavoidable impurities resulting from the elaboration,
  (ii) Atomizing the molten composition through a nozzle the diameter of which is at most 4 mm, with a gas pressurized between 10 and 30 bar.

The process according to the invention may also have the optional features listed below, considered individually or in combination:
  the elements and/or metal alloys melted together comprise FeSi ferroalloy, FeB ferroalloy, FeNb ferroalloy, Cu and Fe,
  the melting is done at a temperature at maximum 450° C. above the liquidus temperature,
  the melting at a temperature at least 300° C. above the liquidus temperature,
  the gas is pressurized between 14 and 18 bar,
  the nozzle diameter is between 2 and 3 mm,
  the gas to metal ratio is between 1.5 and 7,
  the metal powder is subsequently dried.

DETAILED DESCRIPTION

The invention will be better understood by reading the following description, which is provided purely for purposes of explanation and is in no way intended to be restrictive.

Silicon is present in the composition according to the invention at a content of 6.5 to 10 wt %. Si increases the hardness of the alloy and significantly impacts the magnetic properties by decreasing the Curie Temperature and the coercivity, thus reducing the magnetic losses. Also, magnetostriction can be easily tuned with small adjustments of the silicon content.

For these reasons, the Si content is of at least 6.5 wt %. However, the Si content is limited to 10 wt % because, beyond this value, Si increases the brittleness of the alloy.

Preferably the Si content is comprised between 8.0 and 9.0 wt %. This range was found to be a good compromise between coercivity, initial permeability and a low magnetostriction.

The niobium content is comprised between 4.5 and 10 wt %. Nb is very efficient for enhancing the glass forming ability of a Fe-base alloy thanks to its high negative enthalpy of mixing with Fe and a bigger atomic radius than Fe. It promotes confusion within the alloy and reduces the tendency of the atoms to order in crystalline structures. Also, Nb promotes the formation of fine Cu clusters and nano-precipitates where crystallization starts and helps avoiding borides which are detrimental for achieving a micro/nano-crystalline phase.

For these reasons, the Nb content is of at least 4.5 wt %. However, the addition of Nb increases the cost of the composition. So, for economic reasons, its content is limited to 10 wt %.

Preferably the Nb content is comprised between 5.0 and 6.0 wt %. This range was found to further increase the thermal stability while retarding the grain growth.

The boron content is comprised between 0.2 and 2.0 wt %. Boron highly increases the hardness and wear resistance of a material. It is also used for grain refinement and for increasing the Glass Forming Ability (GFA) of the steel, its atomic radius being 69 μm smaller than the Fe atomic radius. For these reasons, the B content is of at least 0.2 wt %. However, the B content is limited to 2.0 wt % because, beyond this value, the formation of boride is promoted which induces brittleness in the material.

Preferably the B content is comprised between 1.0 and 1.8 wt % in order to further avoid brittleness.

The copper content is comprised between 0.2 and 2.0 wt %. Copper has a very low solubility in Fe. Little amounts of Cu are used to form nanosized clusters homogeneously distributed in the alloy to act as nucleant starters and controllers of heterogeneous nucleation. It also increases the hardness and corrosion resistance of the steel. However, high contents of Cu lead to clusters of a bigger size which is not desirable.

Preferably the Cu content is comprised between 0.5 and 1.5 wt % in order to further promote the homogeneity of the Cu nanosized cluster distribution.

The carbon content is below 2 wt %. Carbon is another element that promotes the confusion effect to promote the glass forming ability of the steel. It has a high negative enthalpy of mixing with Fe and its atomic radius is 89 pm smaller than the Fe atomic radius. However, high carbon content can lead to the formation of carbides, in particular niobium carbides, where nucleation will start. This is detrimental to the microstructure.

Preferably the C content is above 0.01 wt %. More preferably, it is comprised between 0.01 and 0.07 wt % to further improve the glass forming ability of the steel and retard crystallization.

Nickel may be optionally present in a content up to 10 wt %. Ni gives ductility and classically good hardenability to steel. In solid solution, it can improve elasticity and toughness to the steel. So, when it is added, the Ni content is generally of at least 0.5 wt %. Nevertheless, high contents of Ni can lead to the formation of undesired phases. Preferably, the Ni content is below 5 wt %.

When Ni is not added, the composition may however comprise up to 0.1 wt % of Ni as an impurity.

Cobalt may be optionally present in a content up to 10 wt %. Cobalt improves the magnetic properties, such as magnetic saturation, and also helps retarding the crystallization since it is a better glass forming element than iron. Preferably, the Co content is below 3 wt %.

When Co is not added, the composition may however comprise up to 0.1 wt % of Co as an impurity.

Chromium may be optionally present in a content up to 7 wt %. Cr improves the corrosion resistance, increases the thermal stability of the amorphous phase, induces structural relaxation and helps tuning the magnetic properties. Preferably, the Cr content is below 3.5 wt %.

When Cr is not added, the composition may however comprise up to 0.1 wt % of Cr as an impurity.

Zr and Mo may be optionally present as substitutes for any part of Nb on a one-to-one basis (atomic). Preferably, Zr or Mo can substitute up to 60% of Nb. These elements have a high glass forming ability in steel with niobium. In particular, Zr is the one with the highest glass forming ability in steel. They also work as grain refiners by hindering the grain growth. Furthermore, Zr can avoid borides formation. As these elements may form compounds with C, B, N and/or O, their content by weight is preferably kept below 3.5 wt %.

When Zr and/or Mo are not added, the composition may however comprise up to 0.1 wt % of each of Zr and Mo as an impurity.

P may be optionally present as a substitute for any part of Si on a one-to-one basis (atomic). This element has a high glass forming ability in steel with niobium. It also works as grain refiner by hindering the grain growth. Preferably, its content by weight is preferably kept below 3.5 wt %.

When P is not added, the composition may however comprise up to 0.1 wt % of P as an impurity.

The composition according to the invention may optionally contain at least one additional element selected from among Hf, Ta, W, V and Y. These elements have a high glass forming ability in steel with niobium. They also work as grain refiners by hindering the grain growth. Furthermore, Hf and Ta can avoid borides formation. On the other hand, these additional elements may form compounds with C, B, N and/or O. Consequently, the content by weight of each of these additional elements is kept below 3.5 wt %.

When these additional elements are not added, the composition may however comprise up to 0.1 wt % of each additional element as an impurity.

The composition according to the invention may optionally contain at least one rare earth metal. They can help retarding the crystallization by increasing the glass forming ability and limiting the grain growth as grain refiners. The content by weight of each of the rare earth metals is kept below 0.2 wt %.

When rare earth metals are not added, the composition may however comprise up to 0.01 wt % of each rare earth metal as an impurity.

The balance is made of iron and unavoidable impurities resulting from the elaboration. Sulfur, nitrogen, oxygen, manganese, aluminum, lead and calcium are the main impurities. They are not deliberately added. They might be present in the ferroalloys and/or pure elements used as raw materials. Their content is preferably controlled to avoid changing detrimentally the microstructure and/or to avoid increasing the grain size and brittleness. Therefore, the content in Mg should be limited to 0.1 wt % and the content in the other impurities should be limited to 0.03 wt %.

The metal powder has a microstructure comprising at least 5% in area fraction of an amorphous phase, the balance being made of crystalline ferritic phases with a grain size below 20 μm and possible precipitates, such as iron boride or Fe16Nb6Si7.

Preferably, the area fraction of the amorphous phase is at most of 45%. More preferably, the area fraction of the amorphous phase is comprised between 20 and 45%. This represents a good compromise between mechanical and magnetic properties.

Preferably, the area fraction of the crystalline ferritic phases is at most of 95%. More preferably, the area fraction of the crystalline ferritic phases is at most of 80% More preferably, the area fraction of crystalline ferritic phases is comprised between 50 to 80%. This represents a good compromise between mechanical and magnetic properties.

Preferably, the crystalline ferritic phases are Fe-$\alpha$(Si) and Fe3Si (DO3). The presence of the Fe3Si (DO3) phase favors the achievement of printed parts with a low magnetostriction, a high maximum permeability, a low coercivity, corrosion and oxidation resistance, friction resistance, high compressive strength.

More preferably, the contribution of the Fe-$\alpha$(Si) phase in the crystalline fraction is comprised between 35 and 55%. More preferably, the contribution of the Fe3Si (DO3) phase in the crystalline fraction is comprised between 30 and 50%. More preferably, the ratio of the Fe-$\alpha$(Si) contribution to the Fe3Si (DO3) contribution in the crystalline fraction is comprised between 0.7 and 1.8. This represents a good compromise between mechanical and magnetic properties.

Preferably, the ferritic phases have an equiaxed or equiaxed dendritic substructure.

Preferably, the microstructure comprises iron boride (Fe23B6) and Fe16Nb6Si7 as precipitates. More preferably, the contribution of the iron boride precipitate in the crystalline fraction is comprised between 0.5 and 5.5%. More preferably, the contribution of the Fe16Nb6Si7 precipitate in the crystalline fraction is comprised between 2 and 12%. These precipitates improve hardness, strength and friction resistance.

The area fractions of the crystalline fraction and amorphous phase and the contribution of each crystalline phase in the crystalline fraction can be calculated by Rietveld refinement of powder X-Ray Diffraction (XRD) measurements.

Preferably, the grain size of the ferritic phases is below 10 μm. Preferably, at least 20% of the grains have a size of at least 1 μm. More preferably, at least 40% of the grains have a size of at least 1 μm. More preferably, at least 10% of the grains are below 0.1 μm. Different grain sizes provide a good balance in term of magnetic properties. Grain size can be measured by Electron Backscatter Diffraction (EBSD), according to ASTM E112-13.

The sphericity of the powder is high. The sphericity SPHT is defined in ISO 9276-6:2008 as $4\pi A/P^2$, where A is the measured area covered by a particle projection and P is the measured perimeter/circumference of a particle projection. A value of 1.0 indicates a perfect sphere. The mean sphericity of the powder is at least 0.80 and can preferably be at least 0.85 or even better at least 0.90. Thanks to this high sphericity, the metal powder is highly flowable. Consequently, the additive manufacturing is made easier and the printed parts are dense and hard. The mean sphericity can be measured with a Digital Imaging Particle Size and Shape Analyzer, such as Camsizer®.

Preferably, not more than 7% of the particles have a SPHT inferior to 0.70.

In addition to the sphericity, the aspect ratio can be used in the classifying of the powder particles. The aspect ratio is defined in ISO 9276-6:2008 as the ratio between the Feret's minimum length to the Feret's maximum length. It can be measured with a Digital Imaging Particle Size and Shape Analyzer, such as Camsizer®. The mean aspect ratio should be preferably above 0.71.

Preferably, at least 80% of the metal powder particles have a size in the range of 15 μm to 170 μm.

The particle size distribution, measured by laser diffraction according to ISO13320:2009, preferably fulfils the following requirements (in μm):

$5 \leq D10 \leq 30$ $15 \leq D50 \leq 65$ $80 \leq D90 \leq 200$

More preferably, $80 \leq D90 \leq 160$. Even more preferably, $100 \leq D90 \leq 160$.

The powder can be obtained by first mixing and melting pure elements and/or ferroalloys as raw materials.

Pure elements are usually preferred to avoid having too much impurities coming from the ferroalloys, as these impurities might ease the crystallization. Nevertheless, in the case of the present invention, it has been observed that the impurities coming from the ferroalloys were not detrimental to the achievement of the micro/nano-crystalline phase.

Ferroalloys refer to various alloys of iron with a high proportion of one or more other elements such as silicon, niobium, boron, chromium, aluminum, manganese, molybdenum . . . . The main alloys are FeAl (usually comprising 40 to 60 wt % Al), FeB (usually comprising 17.5 to 20 wt % B), FeCr (usually comprising 50 to 70 wt % Cr), FeMg, FeMn, FeMo (usually comprising 60 to 75 wt % Mo), FeNb (usually comprising 60 to 70 wt % Nb), FeNi, FeP, FeSi (usually comprising 15 to 90 wt % Si), FeSiMg, FeTi (usually comprising 45 to 75 wt % Ti), FeV (usually comprising 35 to 85 wt % V), FeW (usually comprising 70 to 80 wt % Mo).

Pure elements can notably be carbon and pure metals such as iron, copper, nickel, cobalt, rare earth metals, the additional elements selected from among Zr, Hf, Ta, Mo, W, V, Cr, Y and P.

The person skilled in the art knows how to mix different ferroalloys and pure elements to reach a targeted composition.

Preferably the mix comprises FeSi ferroalloy, FeB ferroalloy, FeNb ferroalloy, Cu and Fe.

Once the composition has been obtained by the mixing of the pure elements and/or ferroalloys in appropriate proportions, the composition is heated at a temperature at least 150° C. above its liquidus temperature and maintain at this temperature to melt all the raw materials and homogenize the melt. Thanks to this overheating, the decrease in viscosity of the melted composition helps obtaining a powder with a high sphericity without satellites, with a proper particle size distribution, along with this specific micro/nano-crystalline structure. That said, as the surface tension increases with temperature, it is preferred not to heat the composition at a temperature more than 450° C. above its liquidus temperature.

Preferably, the composition is heated at a temperature at least 300° C. above its liquidus temperature so as to promote the formation of highly spherical particles. More preferably, the composition is heated at a temperature 300 to 400° C. above its liquidus temperature.

In one variant of the invention, the composition is heated between 1300 and 1600° C. which represents a good compromise between viscosity decrease and surface tension increase.

The molten composition is then atomized into fine metal droplets by forcing a molten metal stream through an orifice, the nozzle, at moderate pressures and by impinging it with jets of gas (gas atomization) or of water (water atomization). In the case of the gas atomization, the gas is introduced into the metal stream just before it leaves the nozzle, serving to create turbulence as the entrained gas expands (due to heating) and exits into a large collection volume, the atomizing tower. The latter is filled with gas to promote further turbulence of the molten metal jet. The metal droplets cool down during their fall in the atomizing tower. Gas atomization is preferred because it favors the production of powder particles having a high degree of roundness and a low amount of satellites.

The atomization gas is preferably argon or nitrogen. They both increase the melt viscosity slower than other gases, e.g. helium, which promotes the formation of smaller particle sizes. They also control the purity of the chemistry, avoiding undesired impurities, and play a role in the good morphology of the powder. Finer particles can be obtained with argon than with nitrogen since the molar weight of nitrogen is 14.01 g/mole compared with 39.95 g/mole for argon. On the other hand, the specific heat capacity of nitrogen is 1.04 J/(g K) compared with 0.52 for argon. So, nitrogen increases the cooling rate of the particles. Argon might be preferred over nitrogen to avoid the contamination of the composition by nitrogen.

The gas pressure is of importance since it directly impacts the particle size distribution and the microstructure of the metal powder. In particular, the higher the pressure, the higher the cooling rate. Consequently, the gas pressure is set between 10 and 30 bar to optimize the particle size distribution and favor the formation of the micro/nano-crystalline phase. Preferably, the gas pressure is set between 14 and 18 bar to promote the formation of particles whose size is most compatible with the additive manufacturing techniques.

The nozzle diameter has a direct impact on the molten metal flow rate and, thus, on the particle size distribution and on the cooling rate. The maximum nozzle diameter is limited to 4 mm to limit the increase in mean particle size and the decrease in cooling rate. The nozzle diameter is preferably between 2 and 3 mm to more accurately control the particle size distribution and favor the formation of the specific microstructure.

The gas to metal ratio, defined as the ratio between the gas flow rate (in Kg/h) and the metal flow rate (in Kg/h), is preferably kept between 1.5 and 7, more preferably between 3 and 4. It helps adjusting the cooling rate and thus further promotes the formation of the specific microstructure.

According to one variant of the invention, in the event of humidity uptake, the metal powder obtained by atomization is dried to further improve its flowability. Drying is preferably done at 100° C. in a vacuum chamber.

The metal powder obtained by atomization can be either used as such or can be sieved to keep the particles whose size better fits the additive manufacturing technique to be used afterwards. For example, in case of additive manufacturing by Powder Bed Fusion, the range 20-63 μm is preferred. In the case of additive manufacturing by Laser Metal Deposition or Direct Metal Deposition, the range 45-150 μm is preferred.

The parts made of the metal powder according to the invention can be obtained by additive manufacturing techniques such as Powder Bed Fusion (LPBF), Direct metal laser sintering (DMLS), Electron beam melting (EBM), Selective heat sintering (SHS), Selective laser sintering (SLS), Laser Metal Deposition (LMD), Direct Metal Deposition (DMD), Direct Metal Laser Melting (DMLM), Direct Metal Printing (DMP), Laser Cladding (LC), Binder Jetting (BJ). Coatings made of the metal powder according to the invention can also be obtained by manufacturing techniques such as Cold Spray, Thermal Spray, High Velocity Oxygen Fuel.

EXAMPLES

The following examples and tests presented hereunder are non-restricting in nature and must be considered for purposes of illustration only. They will illustrate the advantageous features of the present invention, the significance of the parameters chosen by inventors after extensive experiments and further establish the properties that can be achieved by the metal powder according to the invention.

A metal composition comprising 80.2 wt % Fe, 8.4 wt % Si, 5.6 wt % Nb, 1.6 wt % B, 1.3 wt % Cu, 0.023 wt % O, 0.0035 wt % S, 0.052 wt % C and 14.4 ppm N was first obtained by mixing and melting the following ferroalloys and pure elements in the following proportions:

11.5 wt % of FeSi comprising 75.56% Si, 0.018% P, 0.09% C, 0.002% S, 0.82% Al, 8.174 wt % of FeB comprising 82.33% Fe, 18.16% B, 0.13% Al, 0.007% S, 0.31% C, 0.03% P and 0.54% Si, 8.2 wt % of FeNb comprising 67.1% Nb, 1% Si, 0.3% Al, 0.11% C, 0.06% Ta 0.05% N, 0.04% P, 0.033% Pb, 0.01% S and 31.297% Fe, 1.3 wt % of pure Cu 99.9%, 70.83 wt % of iron ingots comprising 99.79% Fe, 0.005% C, 0.001% Al, 0.15% Mn, 0.002% Si, 0.002% P, 0.002% S.

This metal composition was heated up to 1490° C., i.e. 340° C. above the liquidus temperature, and was then gas atomized with argon in the following process conditions:

Gas pressure: 16 bar

Nozzle diameter: 2.5 mm

Gas to metal ratio: 3.37

The obtained metal powder was then dried at 100° C. under vacuum for 0.5 to 1 day.

The metal powder had the following characteristics:

The microstructure was analyzed by XRD. The TOPAS software from Bruker® was used for the Rietveld refinement analysis of the XRD pattern. It was observed that the microstructure comprised, in area fraction, 56% of crystalline ferritic phases, 6.4% of Fe16Nb6Si7 and 2.47% of Fe23B6, the balance being made of an amorphous phase. The crystalline ferritic phases were composed of 52.6% of Fe-$\alpha$(Si) and 47.4% of Fe3Si (Do3). From Electron Backscatter Diffraction (EBSD) measurements, it was observed that, in the crystalline region, the grain size was heterogeneous with regions of bigger grains (1-10 μm), typically located in the center of the powder particle, and regions of smaller grains (under 1 μm), typically located at the edges of it, or close to an amorphous phase. The regions of bigger grains corresponded to 65-80% of the powder crystalline phase.

The mean sphericity SPHT measured by Camsizer® according to ISO 9276-6:2008 was 0.93.

The particle size distribution, measured by laser diffraction according to ISO13320:2009, presented the following characteristics: D10=17.61 μm, D50=61.73 μm and D90=166.1 μm Thanks to these characteristics, the obtained metal powder exhibited the following properties:

The flowability determined by the use of a Hall flowmeter funnel according to ASTM B213-7 was 0.373 s/g.

As for the magnetic properties, measured by Vibrating-Sample Magnetometer (VSM), the coercivity Hc, measured respectively at room temperature and at 400° C., was respectively $2.06 \times 10^{-3}$ T and $8.03 \times 10^{-3}$ T. The Magnetic Saturation Ms, measured respectively at room temperature and at 400° C., was respectively 15.733 Am²/Kg and 80.3

Am²/Kg. The Remanence Mr, measured respectively at room temperature and at 400° C., was respectively 0.115 Am²/Kg and 0.367 Am²/Kg.

What is claimed is:

1. A metal powder having a composition comprising the following elements, expressed in content by weight:
    6.5%≤Si≤10%
    4.5%≤Nb≤10%
    0.2%≤B≤2.0%
    0.2%≤Cu≤2.0%
    C≤2%
and optionally containing:
    Ni≤10 wt %,
    Co≤10 wt %,
    Cr≤7 wt %,
    Zr as a substitute for any part of Nb on a one-to-one basis,
    Mo as a substitute for any part of Nb on a one-to-one basis,
    P as a substitute for any part of Si on a one-to-one basis,
    one or more additional elements selected from a group consisting of Hf, Ta, W, V and Y and wherein a content by weight of each additional element is less than 3.5% and/or,
    one or more rare earth metals, wherein a content by weight of each rare earth metal is less than 0.2%,
    a balance being Fe and unavoidable impurities resulting from processing, the metal powder having a microstructure comprising at least 5% in area fraction of an amorphous phase, a microstructure balance being made of crystalline ferritic phases with a grain size below 20 μm and possible precipitates, the metal powder having a mean sphericity SPHT of at least 0.80, at least 20% of grains in the crystalline ferritic phase having a grain size of at least 1 μm.

2. The metal powder as recited in claim 1 wherein the grain size of the ferritic phase is below 10 μm.

3. The metal powder as recited in claim 1 wherein not more than 7% of the particles composing the metal powder have a sphericity SPHT inferior to 0.70.

4. The metal powder as recited in claim 1 wherein the mean aspect ratio of the particles composing the metal powder is above 0.71.

5. The metal powder as recited in claim 1 wherein at least 80% of the particles composing the metal powder have a size in the range of 15 μm to 170 μm.

6. The metal powder as recited in claim 1 wherein the microstructure comprises at most 45% in area fraction of the amorphous phase.

7. The metal powder as recited in claim 1 wherein the crystalline ferritic phases of the microstructure are Fe-α(Si) and Fe3Si (DO3).

8. The metal powder as recited in claim 1 wherein at least 40% of grains in the crystalline ferritic phase having a grain size of at least 1 μm.

9. The metal powder as recited in claim 8 wherein at least 10% of grains in the crystalline ferritic phase having a grain size of below 0.1 μm.

10. The metal powder as recited in claim 1 wherein at least 10% of grains in the crystalline ferritic phase having a grain size of below 0.1 μm.

11. The metal powder as recited in claim 1 wherein 0.01%≤C≤0.07%.

12. The metal powder as recited in claim 1 wherein 0.01%≤C≤2.0%.

13. A method for manufacturing the metal powder as recited in claim 1, the method comprising:
    (i) melting metals and/or alloys at a temperature at least 150° C. above the liquidus temperature so as to obtain a melt having the composition as recited in claim 1, and
    (ii) atomizing the melt through a nozzle having a diameter of at most 4 mm, with a gas pressurized between 10 and 30 bar.

14. The method as recited in claim 13 wherein the metals and/or alloys comprise FeSi ferroalloy, FeB ferroalloy, FeNb ferroalloy, Cu and Fe.

15. The method as recited in claim 13 wherein the melting is done at a temperature at maximum 450° C. above the liquidus temperature.

16. The method as recited in claim 13 wherein the melting is done at a temperature at least 300° C. above the liquidus temperature.

17. The method as recited in claim 13 wherein the gas is pressurized between 14 and 18 bar.

18. The method as recited in claim 13 wherein the nozzle diameter is between 2 and 3 mm.

19. The method as recited in claim 13 wherein the gas to metal ratio defined as a ratio of gas flow rate in Kg/h to melt flow rate in Kg/h is between 1.5 and 7.

20. The method as recited in claim 13 further comprising subsequently drying the metal powder.

* * * * *